Dec. 23, 1941.  S. RUBEN  2,266,812

ELECTRIC CONDENSER AND DIELECTRIC THEREFOR

Filed June 19, 1939

INVENTOR
Samuel Ruben
BY
ATTORNEY

Patented Dec. 23, 1941

2,266,812

UNITED STATES PATENT OFFICE 2,266,812

ELECTRIC CONDENSER AND DIELECTRIC THEREFOR

Samuel Ruben, New Rochelle, N. Y.

Application June 19, 1939, Serial No. 279,825

4 Claims. (Cl. 175—41)

This invention relates to electrostatic condensers and specifically to a condenser employing an improved styrene dielectric.

This invention is directed to obtaining the advantages of polystyrene and eliminating the inherent disadvantages.

Figure 1:
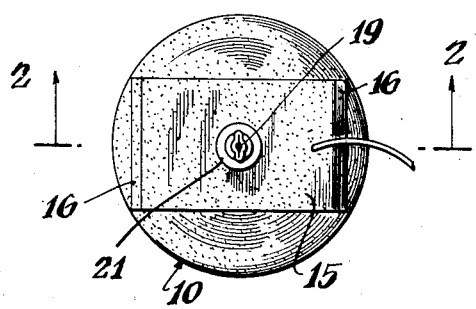
Figure 3:
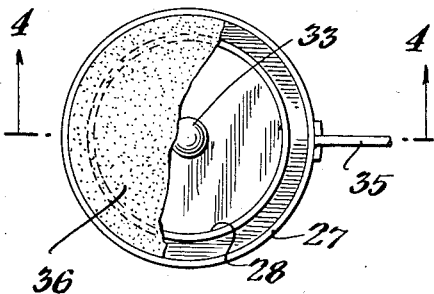
Figure 2:
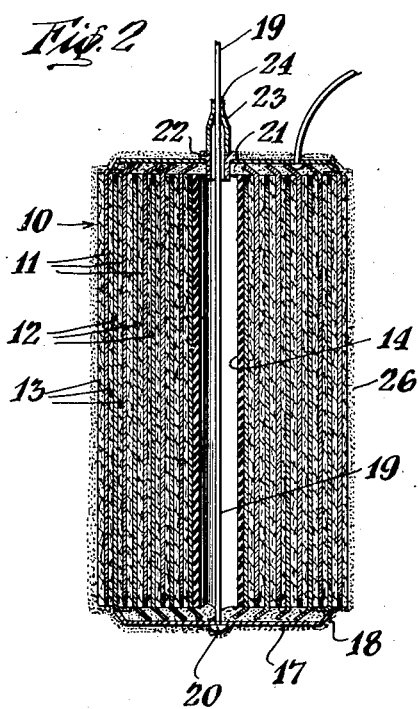
Figure 4:
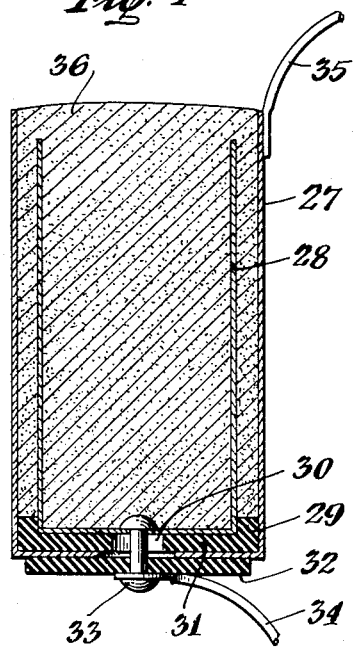

Further objects will be apparent as the disclosure proceeds and from the drawing in which Fig. 2 is a cross-sectional view of a condenser constructed according to the invention; Fig. 1 is a top view in section of Fig. 2; Fig. 4 is a view in section of a cast condenser made according to the invention and Fig. 3 is a top view of Fig. 4.

It has been recognized in the art that polymerized polystyrene has some excellent characteristics for use as a dielectric in an electrostatic condenser and various patents have appeared describing various methods of utilizing styrene.

However, despite its desirable characteristics, there are very definite limitations to its use, as styrene possesses some properties which nullify its advantage of low power factor. Its use heretofore has been practically confined to a film or sheet form in applications where both the voltage and temperature are kept to relatively low limits.

Polystyrene shows no definite melting point below its temperature of decomposition (300° C.) at which point it reverts back to the monomeric form which has a power factor of about ten times the polymeric form, but at 70° to 90° C. it is soft and assumes rubber-like properties. Thus, in order to use it to advantage, the styrene must be processed to its highest polymeric form. Furthermore, when heated in operation the power factor rises rapidly and at locally heated areas there is a tendency to depolymerize which further increases its loss.

The property of decomposing at temperatures approaching its melting point has prevented polystyrene from being impregnated into an evacuated dehydrated porous spacer in the manner necessary for a practical and stable condenser. Where impregnation with a monomeric liquid form has been resorted to, the resultant poor power factor due to unpolymerized styrene content, brought about by the necessary limiting of polymerizing temperature to the destruction temperature limit of the paper spacer, has prevented the production of a practical condenser utilizing an impregnated layer of polystyrene.

Furthermore, the introduction of polymerized accelerators has introduced impurities which nullify the good properties of the styrene. With polystyrene, the minimum power factor is obtained with material polymerized at the highest temperature, for example 250° C., a temperature above that which any paper spacer could stand. When used in film or sheet form the voltage is limited by the inherent tendency of polystyrene to check, especially if it is attempted to wind a unit. Furthermore any attempt to evacuate a styrene condenser usually involves building up of trapped vapor pockets which will cause low voltage breakdown.

Polystyrene can be stabilized by hydrogenation to the hexahydro form. Hexa hydro polystyrene is stable and has a definite melting point of 150–160° C. at which temperature it liquifies. It does not dissociate into the monomeric form and has a decomposition temperature of 350–400° C. compared to the polystyrene of 300° C.

The hydrogenation of the polystyrene to form the hexa hydro-polystyrene is readily accomplished by well known methods of hydrogenation, for example for every gram of polystyrene 2 grams of nickel powder is added as catalyst and suspended in 20 cm. decaline. After removal of air in an autoclave, 80 atmospheres of hydrogen and a temperature of 200° C. is applied for two hours. Complete reduction of polystyrene is obtained and the hexahydro-polystyrene formed is extracted with benzene and precipitated with methyl alcohol. The material, when dried, is a white powder having a melting point of 150° C.

Of most importance in connection with its use in this invention is that hydrogenated polymerized styrene can be liquified and thereby impregnated into a porous spacer in an evacuated chamber. Furthermore, and also of primary importance, it can be plasticized with hydrocarbons.

In the manufacture of the condenser, the paper spacers are wound with aluminum electrodes, evacuated and thereafter impregnated with liquified hexa hydro polystyrene.

Of importance in reference to the impregnation of the paper is the desirability of using a paper having a porosity better than 3 cc. in 15 sec.

While with liquid dielectrics such as mineral oil, castor oil or chlorinated di-phenyl it is of advantage to have a dense paper, one having a porosity less than 5 cc. in 15 sec. for a .3 mil paper, such paper with a viscid material such as liquified hexa hydrostyrene will be poorly impregnated and the condenser will have short life with low breakdown voltages. By use of a paper having a porosity of about 20 cc. in 15 seconds, satisfactory impregnation is obtained. The impregnation can be materially helped by the addition of liquid hydrocarbon plasticizers such as the dimer of di-hydro-naphthalene or mineral oils. The composite dielectric is simply prepared by heating the hydrogenated polymerized styrene to 150° C. and adding the plasticizer. The percentage of added plasticizer is determined by the desired resultant power factor, desired impregnation temperature and porosity of the paper. For minimum power factor the plasticizer content should be held to a minimum. The composite dielectric is thermoplastic, liquifiable and stable.

With many dielectric materials the resultant power factor of the condenser after impregnation of the dielectric in a porous spacer such as paper is many times that of the resin itself. For example, certain grades of styrene in sheet form will show a power factor of .03% while the power factor of a condenser in which the same material is impregnated into paper spacers will be .3%. By using an inorganic spacer as fibrous glass or one made by coating aluminum foil with a bonded layer of powdered silica suspended in a polystyrene solution, then impregnating a unit wound with this coated foil instead of paper it is possible to obtain low power factor.

In Figs. 1 and 2 the condenser section 10 comprises a pair of metal foil electrodes 11 and 12, preferably .0003" aluminum wound together with a pair of linen paper spacers 13 .0003" thick. The foils are offset so that foil 11 projects beyond the paper at the top of the roll and terminates short of the spacers at the bottom and foil 12 projects at the bottom and is overlapped by the spacers at the top. The foils and paper are wound around hollow mandrel 14. Connection with the offset electrode is made by means of rectangular bronze spring plates 15 and 17, having bent down contacting portions 16 and 18 respectively, the edges of which make contact with electrode foils 11 and 12. Plate 17 has attached thereto wire terminal 19, soldered to the plate at 20, the wire being pulled up through mandrel 14. Plate 15 has a central aperture into which is inserted ceramic insulator 21 into which closely fits metal tube 23 through which passes wire terminal 19. In assembling the condenser after winding, the wire 19 is tightly pulled up so as to cause plates 15 and 17 to make close pressure contact with the electrodes and tube 23 is then flattened as shown at 24 so as to permanently lock the assembly in place. A terminal for electrode 12 is provided by soldering a wire 25 to plate 15. After the condenser has been thus assembled it is evacuated to remove all moisture and is then impregnated with a solution of 85% hydrogenated polymerized styrene-15% plasticizer. The impregnation is carried out at a temperature of 150° C. and the fluid dielectric completely saturates the paper spacers. The impregnant 26 acts as a complete seal for the condenser and ordinarily no additional seal is required, other than the usual container, such as cardboard or metal. If increased voltage breakdown is desirable, I may add a sheet of specially processed regenerated sheet cellulose for each of the paper spacers. The combination paper-regenerated sheet cellulose separators are especially useful for a number of applications.

Due to the very high resistance to moisture of the dielectric materials described, no further sealing compound need be applied after the condenser is impregnated.

In Figs. 3 and 4 which show a cast form of the condenser in greatly exaggerated size, the electrodes consist of the concentric aluminum tubes 27 and 28 separated by ceramic collar 29. Rivet 33 which contacts electrode 28, extends through wide apertures 30 and 31 in ceramic collar 20 and electrode 27 respectively, and through insulating button 32. Wire terminal 34 is soldered or otherwise attached to rivet 33 and wire 35 is soldered to electrode 27 in order to provide the other terminal. After the assembly has been completed, plasticized hydrogenated polymerized styrene dielectric 36 is poured at a temperature of 150° C. and rapidly cooled in place into solid form. In other constructions, the dielectric in powdered form can be pressed into shape with one or both electrodes, heated to 150° C. and cooled. If desirable one of the electrodes can be formed by metal spraying and a terminal fastened to the sprayed surface.

The construction shown in Figs. 1 and 2 employs a paper separator, but it is possible and in some cases desirable to substitute for the paper a separator of pre-shrunk regenerated plasticizer free sheet cellulose.

While I have described two types of electrostatic condensers employing the solid hydrogenated polymerized styrene dielectric it is also possible to manufacture the condenser by other methods known to the art, for instance, by directly coating foil electrodes with the dielectric composition without the use of an additional intervening spacer or by impregnating a porous spacer such as paper with the dielectric, thereafter winding the impregnated paper spacers with the electrode foils and subsequently heating the rolled unit to cause the impregnated paper to adhere to the foils and to provide a moisture proof seal around the unit.

What is claimed is:

1. An electrostatic condenser having armatures and a dielectric comprising hydrogenated polymerized styrene.

2. An electrostatic condenser having armatures and a dielectric comprising hydrogenated polymerized styrene and a plasticizer combined therewith.

3. An electrostatic condenser having armatures and a dielectric comprising the product of solid liquifiable hydrogenated polymerized styrene and a plasticizer miscible therewith, said composite dielectric being thermoplastic, stable and liquifiable.

4. In an electrostatic condenser of the wound foil type, a dielectric comprising thermoplastic liquifiable hydrogenated polymerized styrene.

SAMUEL RUBEN.